Sept. 11, 1923.  1,467,583
F. E. LICHTENTHAELER
APPARATUS FOR THE MANUFACTURE OF ETHER
Filed May 28, 1921
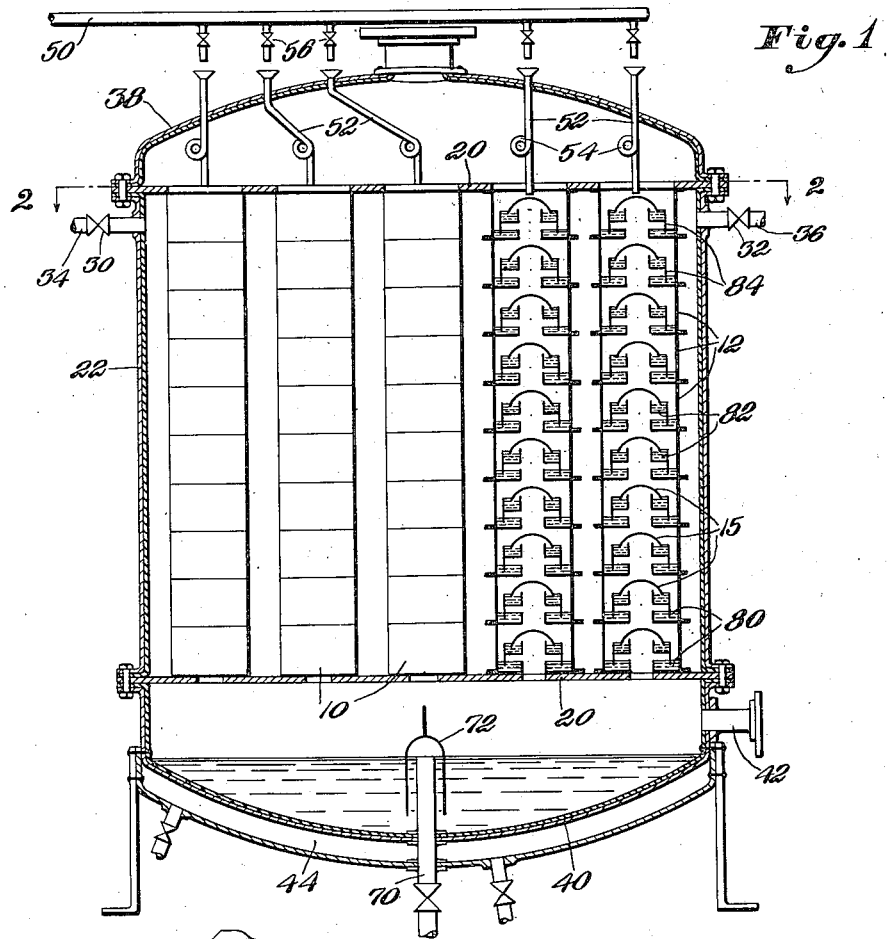

Patented Sept. 11, 1923.

1,467,583

UNITED STATES PATENT OFFICE.

FRANK E. LICHTENTHAELER, OF NEWTON HIGHLANDS, MASSACHUSETTS.

APPARATUS FOR THE MANUFACTURE OF ETHER.

Application filed May 28, 1921. Serial No. 473,431.

*To all whom it may concern:*

Be it known that I, FRANK EDWARD LICHTENTHAELER, a citizen of the United States, residing at Newton Highlands, in the county of Middlesex and State of Massachusetts, have invented certain new and useful Improvements in Apparatus for the Manufacture of Ether; and I do hereby declare the following to be a full, clear, and exact description of the invention, such as will enable others skilled in the art to which it appertains to make and use the same.

This invention relates to apparatus for the manufacture of ether.

At the present time ether is manufactured from ethyl alcohol by means of sulphuric acid according to the following well-known reaction:—

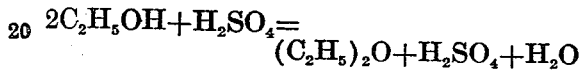

$$2C_2H_5OH + H_2SO_4 = (C_2H_5)_2O + H_2SO_4 + H_2O$$

The sulphuric acid acts as a contact agent and is itself regenerated during the reaction. During the progress of the reaction, tarry decomposition products are formed due to inequalities in the heating of the sulphuric acid and alcohol, which together with the gradual dilution of the acid operates to deplete the acid and render it unsuitable for further use as a reagent.

The general practice heretofore employed in carrying out the above reaction for the manufacture of ether contemplated the admission of alcohol in liquid form to a generator in which a large body of sulphuric acid was received. In this process, however, the inequalities of distribution of the alcohol through the acid and the inability of the operator to control the temperature resulted in many operating difficulties and troubles, as for example in the formation of excessive quantities of decomposition products due to the overheating of the alcohol and sulphuric acid. Recently this original process has been improved in certain aspects by the vaporization of the alcohol in a separate apparatus before introduction into the body of sulphuric acid and by the use of a superheater to preheat the vapor of the alcohol. In this way better distribution of the alcohol was obtained, but in the usual form of apparatus employed to carry out the process the requisite temperature was maintained by the use of steam under pressure in lead coils or lead covered coils within the solution. This method of heating the solution still produced localized heating with the resulting side reactions and the formation of decomposition products. Furthermore, it was impossible to heat the solution uniformly because of the small circulation induced in the liquid from the heating coils. This method of heating the solution also presented serious danger because of the tendency of the lead coils themselves to split under pressure thus admitting the steam directly into sulphuric acid, a condition most favorable to explosions.

Because of the foregoing difficulties and troubles encountered with the different form of apparatus heretofore used, the efficiency of the sulphuric acid rapidly decreased during the operation. Not only was the acid diluted but also the formation of tarry decomposition products, resulting from the inequalities of heating, soon rendered the acid unfit for use, so that as a matter of fact, these prior processes were far from continuous and after one lot of acid had been used for a comparatively short time it became spent and had to be replaced with a fresh lot.

The object of the present invention is to provide apparatus for the manufacture of ether of novel construction and by which the difficulties heretofore encountered in prior forms of apparatus may be eliminated so that substantially pure ether may be manufactured continuously at a relatively low cost.

In the drawing illustrating the preferred form of the aparatus, Fig. 1 is a vertical section, on line 1—1 of Fig. 2, showing two of the contact units in detail and the others diagrammatically; and Fig. 2 is a sectional view on the line 2—2 of Fig. 1.

The apparatus illustrated in the drawings comprises a number of contact units 10 within which the reaction of the alcohol and sulphuric acid takes place. Each contact unit 10 is made up of a plurality of chambers 12 arranged above one another and the flanges of which are fastened together to form the complete contact unit. A body of sulphuric acid is received upon a retaining deck within each chamber 12. Vapor caps 15 are provided for the purpose of causing the vapors of alcohol, as they ascend upwardly through the contact unit, to bubble through the body of sulphuric acid upon each deck.

The contact units 10 are made tight to top and bottom decks 20 closing the top and bottom of an outer jacket or casing 22. The intercommunicating space between the several contact units 10 and within the outer jacket or casing 22 is utilized for the reception of a heating fluid which may comprise steam, but which will preferably comprise oil. The heat is circulated through this space between the several contact units, its flow being controlled by the valves 30, 32 in the inlet and outlet pipes 34, 36, respectively.

A dome 38 is bolted to the upper end of the casing 22, as shown in Fig. 1, and forms a vapor space into which the vapors from the several contact units pass and from which they are conducted to the usual neutralizing and rectifying apparatus not shown. A bottom chamber 40 is bolted to the bottom of the casing 22 and constitutes a receptacle for the spent acid, as will be described, and also serves as a vapor chamber to afford distribution of the alcohol vapor admitted thereto through the inlet pipe 42 to the several contact units. The bottom chamber is provided with a steam jacket 44 for the purpose of freeing the last traces of ether and alcohol from the spent acid, as will be described.

Sulphuric acid is fed to the top of each contact unit from the supply pipe 50 through feed pipes 52, each of which is provided with an acid seal 54 of sufficient depth to withstand the operating pressure within the generator. The flow of the acid to each contact unit is controlled by valves 56, so that sufficient acid may be introduced to exactly counter-balance the depletion of the acid by the water and other by-products formed during the reaction.

In the operation of the generator, alcohol vaporized and suitably heated in a separate apparatus comprising preferably the usual super-heater at present employed, is admitted to the bottom chamber of the generator through the inlet pipe. The alcohol gas passes to the several contact units being equally distributed between them because of the equality of the back pressure of the several units. As the alcohol vapors rise through the several contact units, they are caused to bubble successively through the sulphuric acid seals upon each deck, rising from chamber to chamber, counter-current to the downward flow of the acid from the feed pipes. The feed of sulphuric acid consists of graduated drops, the necessity of replacement being relatively slight so that the several bodies of acid within the several chambers of each contact unit are in a nearly static condition, the flow from one chamber to the other being very slight to balance whatever depletion occurs due to the formation of water and other products of the reaction. The spent acid overflows from the lowermost of the chambers downwardly into the bottom chamber of the generator where it is finally freed of the last amounts of alcohol and ether by means of the steam or oil heated jacket. A uniform level of spent acid is maintained within the bottom chamber by a drain pipe 70 having a cap 72 immersed in the acid to provide a vapor seal.

An important feature of the apparatus consists in the uniformity with which the heat of the oil or other fluid surrounding the several contact units is distributed to the acid. It will be observed that a relatively large surface is provided to afford efficient heat transmission to the relatively small quantity of acid contained within each compartment or chamber. The temperature of the acid is maintained in the neighborhood of 125° C. In practice, the chambers are made of lead castings of a comparatively small radius as, for example, a six inch radius. The use of steam under pressure as a heating medium may be successfully undertaken with the present chamber for the reason that these lead castings are subjected to compression instead of tension, with the result that small danger exists of the fracture of the lead castings under compression so that there is relatively slight liability of the steam ever coming in contact with the acid. In the usual lead coils heretofore employed, within which high pressure steam was received, the lead was subjected to tension and considerable danger always accompanied the use of steam under any considerable pressure.

While any desired form of vapor cap may be employed, the particular form of vapor cap illustrated in Fig. 1 constitutes an efficient and desirable cap for the purposes of ether manufacture. In the construction illustrated in Fig. 1, one body of acid is received upon a trough 80 formed upon the deck of the chamber and a second body of acid is received within a second trough 82 formed upon a cylindrical downtake 84. A cap 15 extends into the upper body of acid and the space between the deck and the downtake is sealed by the lower body of acid. In operation, the vapors are caused to bubble through the upper seal under the cap, whereas the overflow from the next higher deck or chamber falls upon the cap and is deflected into the upper chamber and overflows through the annular space surrounding the downtake down into the lower chamber. In this manner efficient contact is secured between the ascending vapors and descending acid.

Having thus described the invention what is claimed is:—

1. An apparatus of the character described having, in combination, a plurality of conduits, means for supplying a liquid to one end thereof, means for retarding the flow of liquid through the conduits, means for supplying vapor to the second end of the conduits, and a pressure jacket surrounding all of the conduits for containing a heating medium to maintain the liquid and vapor within the conduits at reaction temperature.

2. An apparatus of the character described having, in combination, a plurality of conduits, a series of decks within each conduit, means for supplying a liquid to one end of the conduits, means for supplying a vapor to the second end of the conduits, and a pressure jacket surrounding all of the conduits for containing a heating medium to maintain the liquid and vapor within the conduits at reaction temperature.

3. An apparatus of the character described having, in combination, a plurality of conduits comprising columns, decks within the columns having vapor caps, a shell surrounding the columns for containing a heating medium to externally heat the several columns, means for distributing vapor to the bottom of the columns, and means for selectively feeding liquid to the top of each column to control the concentration of the liquid upon the decks within each column.

4. An apparatus of the character described having, in combination, a casing provided with top and bottom decks, a plurality of columns within the casing secured to the top and bottom decks to form tight joints at these points, a plurality of decks and vapor caps within each column, a bottom chamber secured to the lower end of the outer casing, a vapor inlet into said bottom chamber, a dome secured to the top of the outer casing and having a vapor outlet, and a plurality of feed pipes communicating with the top of each column to supply liquid thereto and thereby control the concentration of the liquid within the columns.

FRANK E. LICHTENTHAELER.